United States Patent
Schnur et al.

(10) Patent No.: US 6,283,637 B1
(45) Date of Patent: Sep. 4, 2001

(54) METHOD FOR DETUNING THE NATURAL FREQUENCY OF A ROTATABLE PART AS WELL AS A TUNABLE ROTATABLE PART

(75) Inventors: Juergen Schnur, Ditzingen; Silvia Tomaschko, Ulm, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/329,800

(22) Filed: Jun. 10, 1999

(30) Foreign Application Priority Data

Jun. 13, 1998 (DE) ................................ 198 26 176

(51) Int. Cl.⁷ ............................ F16C 32/00; F16C 25/00; F16G 23/00
(52) U.S. Cl. ............................................. 384/519; 384/1
(58) Field of Search ....................... 384/1–36, 491–513, 384/514–548

(56) References Cited

U.S. PATENT DOCUMENTS

| | | | |
|---|---|---|---|
| 4,850,719 | 7/1989 | Moseley et al. | 384/1 |
| 5,221,146 | 6/1993 | Maruyama | 384/447 |
| 5,332,061 | 7/1994 | Majeed et al. | 180/312 |
| 5,434,783 | 7/1995 | Pal et al. | 364/424.05 |
| 5,509,198 | * 4/1996 | Takamizawa et al. | 29/898.09 |
| 5,564,840 | 10/1996 | Jurras, III et al. | 384/517 |
| 5,660,481 | * 8/1997 | Ide | 384/122 |

FOREIGN PATENT DOCUMENTS

| | | |
|---|---|---|
| 31 23 590 | 1/1983 | (DE) . |
| 36 06 042 | 9/1986 | (DE) . |
| 39 00 121 | 7/1990 | (DE) . |
| 93 01 334 U | 5/1993 | (DE) . |
| 42 27 366 | 2/1994 | (DE) . |
| 195 31 402 | 2/1997 | (DE) . |
| 195 41 245 | 5/1997 | (DE) . |
| 695 08 203 | 7/1999 | (DE) . |
| 0 377 145 | 7/1990 | (EP) . |
| 2 279 999 | 1/1995 | (GB) . |
| 61-127922 | 6/1986 | (JP) . |
| 1-266320 | 10/1989 | (JP) . |

* cited by examiner

Primary Examiner—Sherry Estremsky
Assistant Examiner—Tisha D. Lewis
(74) Attorney, Agent, or Firm—Crowell & Moring LLP

(57) ABSTRACT

A method and apparatus for detuning the natural frequency of a rotatable part, which is rotatably disposed in the shaft bearing, and in the case of which the axis of rotation of the rotatable part is arranged axially identically with the axis of rotation of the shaft bearing, as well as to a correspondingly tunable rotatable part. For compensating an axial play and/or a disturbing sound effect, the clamping conditions are changed by a reversible change of the axial course and/or of the axial contact pressure of an axial adjusting unit onto the rotatable part, the axial adjusting unit being manufactured of a piezoelectrically active material.

9 Claims, 3 Drawing Sheets

METHOD FOR DETUNING THE NATURAL FREQUENCY OF A ROTATABLE PART AS WELL AS A TUNABLE ROTATABLE PART

TITLE OF THE INVENTION

BACKGROUND AND SUMMARY OF THE INVENTION

The invention relates to a method for detuning the natural frequency of a rotatable part which is rotatably disposed in the shaft bearing, and in the case of which the axis of rotation of the rotatable part is arranged axially identically with the axis of rotation of the shaft bearing, as well as to a tunable rotatable part which is rotatably disposed in the shaft bearing, and in the case of which the axis of rotation of the rotatable part is arranged axially identically with the axis of rotation the shaft bearing.

In machine construction, rotatable parts are generally rotatably held by means of shaft bearings or pivot bearings, such as ball bearings, tapered-roller bearings, slide bearings, etc. In the case of rotatable part/shaft bearing connections, changes of the clamping conditions, as, for example, a play, may occur. The changes are generally not static but may change, particularly as a result of thermal effects. Various effects are connected with the change of the clamping conditions of the rotatable part in the shaft bearing. Thus, particularly the natural frequencies and/or the vibration amplitudes of the rotatable part will change. Sometimes, a compensation of the occurring changes will be achieved in that the rotatable part/shaft bearing connection is prestressed particularly by a spring or by an elasticity of the material, the prestressing partially affecting bearing shells.

Compensation arrangements of this type are known, for example, from German Patent Documents DE 195 41 245 A1, DE 38 10 448 C2, DE 93 01 334 U1 or DE 31 23 590 A1.

Furthermore, machines having rotating parts have at least usually a certain disturbing sound effect. One reason for these disturbing noises is, among others, that the rotating rotatable parts, particularly shafts, introduce vibrations into other components. Resonance frequencies are important for the transmission of vibrations between components and for the introduction of vibrations from one component to another. The mathematical relationship of this frequency-dependent transmission is called transmission function.

From U.S. Patent Document U.S. Pat. No. 5,332,061 A1, a method is known for suppressing vibrations introduced into the vehicle body as well as a corresponding vehicle. The concerned introduced vibrations originate from the engine and, in this case, particularly from the moving parts, such as the rotating crankshaft or camshaft. The vibrations are transmitted at the connection points of the engine with the vehicle body. For damping these vibrations, the vehicle has shakers, thus, mechanical vibration exciting devices which are arranged in the area of at least some connection points of the engine with the vehicle body. During the operation of the engine, the shakers are excited as a function of the rotational speed of the engine at the resonance frequencies in antiphase to the vibrations coming from the engine, whereby the transmission of the introduced vibrations is at least dampened. In this case, the corresponding frequencies and their amplitudes for the artificial secondary vibrations introduced in a targeted manner are taken from a previously filed data field.

From U.S. Patent Document U.S. Pat. No. 5,434,783 A1, a vehicle is known, in the case of which the sound effect audible inside the occupant compartment is influenced by sound waves. In addition to normal loudspeakers, a piezo-element is also used here which excites the vehicle body at least in areas to carry out vibrations and thereby causes it to emit sound waves; that is, the piezoelement acts like the coil of a loudspeaker while the vehicle body represents the vibrating membrane. By means of the known method and the known system, an improvement of the subjective sensation inside the occupant compartment is achieved.

A further development of the above system for influencing the subjectively perceived driving sensation is known from German Patent Document DE 195 31 402 A1. According to this document, as a function of a parameter and in this case particularly of the rotational engine speed and/or the vehicle speed, not only the airborne sound but also the structure-borne sound or vibrations perceived by the body are influenced. For this purpose, depending on the size of the parameter, certain data are read out of a data field and, by means of vibration exciting devices are converted to artificial vibrations which, among others, can also be perceived by the body. As a result of these measures, in conjunction with the influencing of the acoustically perceived airborne sound, positive as well as negative interferences of the targeted introduced artificial secondary vibrations can be generated with the primary vibrations which occur on the vehicle side when the vehicle is operated. As desired, the interferences can reduce the perceived impression or simulate a certain impression, for example, a shifting in the case of a vehicle provided with an infinitely variable speed transmission.

It is an object of the invention to develop a method by means of which the perceivable vibrations of an engine having rotating rotatable parts and, at the same time, a possibly occurring axial play can be at least reduced. Furthermore, it is an object of the invention to suggest a new system by means of which perceivable vibrations and, at the same time, a possibly occurring axial play can be at least reduced.

According to the invention, as the result of the targeted and reversible change of the axial adjusting unit having particularly piezoelements or of the contact pressure axially acting upon the rotatable part, the axial clamping conditions during the operation can be changed by a targeted intervention from the outside. The changing of the clamping conditions has, for example, the result that the values of the inherent vibrations of the rotatable part and also the transmission function from the rotatable part to another component are changed. As the result of the change of the transmission function, the transmission of vibrations, thus of the transmittable energy, coming from the rotatable part, into another component are changed, particularly at least reduced.

In the case of the axial adjusting unit, the intervention takes place by the application of an electric voltage. This measure leads to a change of the resonance or natural frequencies of the rotatable part and also to a change during the transmission and introduction of vibrations. The respective resonance frequencies are important for the transmission of vibrations between components and for the introduction of vibrations from one component to another component, The mathematical relationship of this frequency-dependent energy transmission or vibration transmission is called transmission function.

As the result of this intervention, the resonance between the rotatable part and the environment transmitting the vibrations is therefore disturbed, whereby the sound effects which are particularly perceived to be disturbing are reduced. Since, in the case of an existing axial play, the change of the axial clamping conditions is connected by an axial movement at least of a part of the axial adjusting unit, simultaneously at least a reduction of this axial play can be achieved.

In a preferred manner, this is expedient in the case of a crankshaft and/or camshaft of an internal-combustion engine, preferably a diesel engine or gasoline engine, as a rotatable part because, in a simple fashion, the introduced vibrations and of these particularly the sound emission inside an occupant compartment of a combustion-engine-driven vehicle can be influenced.

This method and this arrangement can expediently be used in the case of rotatable parts of electric motors, as particularly rotors, but also in airplane engines, for example, jet engines or propellers.

In a preferred manner, the use of the invention is also expedient in the case of a crankshaft and/or camshaft of an internal-combustion engine, preferably a diesel engine or gasoline engine, as a rotatable part because, in a simple fashion, the introduced vibrations and of these particularly the sound emission inside an occupant compartment of a combustion-engine-driven vehicle can be influenced. The influencing of the noise level, which the operator of a vehicle perceives, in particular, as disturbing and which comes at least partially from the engine, takes place at the site where it arises and not, as previously customary, only at the site where the operator perceives it. In an advantageous manner, this reduces, among other things, the expenditures with respect to the electronic control system and the equipment construction (microphone, loudspeaker and the like).

Meaningful further developments of the invention are contained in the subclaims. In addition, the invention is explained in detail by means of embodiments illustrated in the drawings.

DETAILED DESCRIPTION OF THE PREFERRED EMBODIMENTS

Figure 1:
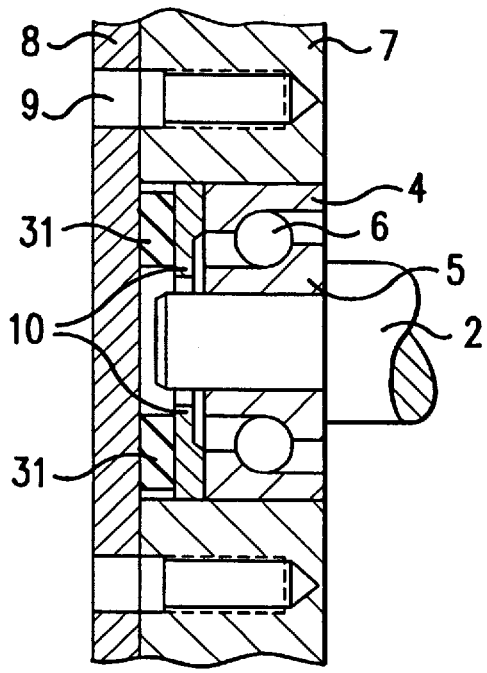
FIG. 1 is a view of a face-side receiving arrangement of a rotatable part with an axial adjusting unit arranged on the interior side in a surrounding component.

FIG. 1 illustrates a face-side receiving arrangement of a rotatable part 2 in a surrounding component 7. The rotatable part 2 has a stop on which the radius changes abruptly. The stop of the rotatable part rests directly on the interior ring 5 of the shaft bearing and is therefore arranged in the axial direction without play in the shaft bearing. The shaft bearing has an outer shell 4, and inner shell 5, as well as balls 6 rollably arranged between the outer shell 4 and the inner shell 5.

The inner shell 5 and the outer shell 4 each have only one contact surface or sliding surface for the balls 6 which is situated transversely with respect to their axis of rotation. As the result of the construction, the inner shell 5 can be axially displaced to a certain extent relative to the outer shell 4.

In the direction of the face side of the rotatable part 2, a counterring 10 rests against the outer shell 6 of the shaft bearing. On the other side of the counterring 10, a ring-shaped piezoelement rests against the counterring, which piezoelement forms the axial adjusting unit 31. A cover plate 8, in turn, rests on the piezoelement on the other side of the piezoelement. The cover plate 8 is connected by means of screws 9 with the component 7 which receives the shaft bearing and surrounds it. As the result of this construction, the axial adjusting unit 31 is supported on its one side against the surrounding component 7 and, on its other side, against the outer shell 4 of the shaft bearing.

In this case, the material of the piezoelements of the axial adjusting unit 31 is selected such that the axial dimension of the piezoelements is enlarged when an electric voltage is applied. In the case of an enlargement of the axial dimension of the piezoelements, the counterring 10 is pressed more in the direction of the outer shell 4 and a corresponding force is transmitted. From the outer shell 4, the force is transmitted by way of the balls 6 to the inner shell 5 and therefrom to the stop of the rotatable part 2. As the result of this power flux acting in the axial direction, the axial clamping condition of the rotatable part 2 is changed and the resonance frequency of the rotatable part 2 is detuned so that the transmission function is changed in a targeted, preferably noise-minimizing manner.

In the case of an existing axial play, the whole arrangement is pushed in the above-described case by way of the countering in the direction of the stop of the rotatable part 2 and the axial play is at least reduced. As the result of the change of the geometry of the piezoelements of the axial adjusting unit 31, a possibly occurring axial play can therefore also be compensated.

Furthermore, the piezoelements of the axial adjusting unit 31, in the event of a vibration occurring in the rotatable part 2, can be excited by the application of an alternating voltage to carry out a secondary vibration. The secondary vibration is transmitted to the rotatable part 2 by way of the components conducting the power flux and is caused to enter an interference with the occurring vibration, particularly a natural vibration of the rotatable part 2. By means of the interference with the secondary vibrations, the vibration occurring at the rotatable part is changed and particularly damped.

The secondary vibration is expediently changed as a function of the occurring vibration. For this purpose, it is useful to sense the occurring vibration, to analyze it by means of a mathematical algorithm—such as a Fourier transformation—and, as a result, by means of correspondingly generated sets of data, excite the half-shell piezoelements of the axial adjusting unit 31 to carry out a corresponding secondary vibration.

Figure 2:
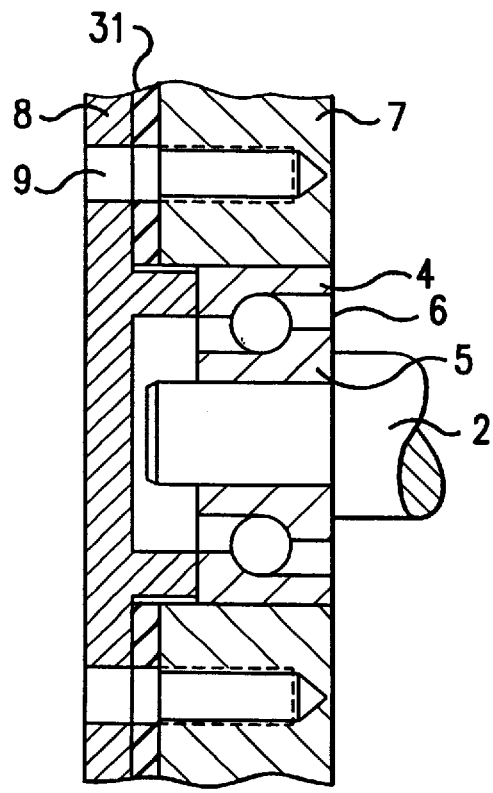
FIG. 2 is a view of another face-side receiving arrangement of a rotatable part.

FIG. 2 shows another embodiment of a face-side receiving arrangement of a rotatable part 2 in a surrounding component 7. The shaft bearing present here corresponds with respect to the construction to that of FIG. 1. The rotatable part 2 has a stop at which the radius changes abruptly. The stop of the rotatable part rests directly on the inner ring 5 of the shaft bearing and, as a result, is arranged in the axial direction without play in the shaft bearing.

However, in contrast to the previous embodiment, the former counterring and the cover plate 8 are combined to form a single component, the function of the former counterring now being taken over by a type of dome which projects from the cover plate 8 in the direction of the shaft bearing and rests by means of its face side on the outer shell 4 of the shaft bearing. The axial adjusting unit 31 is formed by piezoelements which are arranged in the area of the screws 9 in the manner of a washer between the cover plate 8 and the surrounding component 7.

In this case, the material of the piezoelements of the axial adjusting unit 31 is selected such that the axial dimension of the piezoelements is reduced when an electric voltage is applied, whereby the screws 9 tightened with prestress press the cover plate 8 more in the direction of the rotatable part. This force is transmitted by way of the dome to the outer shell 4. From the outer shell 4, the force is transmitted by way of the balls 6 to the inner shell 5 and therefrom to the stop of the rotatable part 2. As the result of this power flux acting in the axial direction, the axial clamping condition of the rotatable part 2 is changed and the resonance frequency of the rotatable part 2 is detuned so that also here the transmission function is changed in a targeted, preferably noise-minimizing manner.

In the case of an existing axial play, the whole arrangement is pushed in the above-described case by way of the dome in the direction of the stop of the rotatable part and the axial play is at least reduced. As the result of the change of the geometry of the piezoelements of the axial adjusting unit 31, a possibly occurring axial play can therefore also be compensated.

Furthermore, the piezoelements of the axial adjusting unit 31, in the event of a vibration occurring in the rotatable part 2, can be excited by the application of an alternating voltage to carry out a secondary vibration. The secondary vibration is transmitted to the rotatable part 2 by way of the components conducting the power flux and is caused to enter an interference with the occurring vibration, particularly a natural vibration of the rotatable part 2. By means of the interference with the secondary vibration, the vibration occurring at the rotatable part is changed and particularly damped.

The secondary vibration is expediently changed as a function of the occurring vibration. For this purpose, it is useful to sense the occurring vibration, to analyze it by means of a mathematical algorithm—such as a Fourier transformation—and, as a result, by means of correspondingly generated sets of data, excite the half-shell piezoelements of the axial adjusting unit 31 to carry out a corresponding secondary vibration.

A high-expenditure electronic sensing and/or analyzing system for the occurring vibration can be eliminated in a special manner if the sets of data for controlling the clamping conditions and/or the secondary vibration are taken from a preferably electronic data memory, in which data sets, which had previously been determined by examples, are filed. In particular, the retrieval of a respective data set takes place as a function of a parameter correlated with the operation of the rotatable part 2.

In other cases, it is expedient to determine the occurring vibrations and to select the data sets for the secondary vibration corresponding to the determined vibration.

If the rotatable part 2 is a rotating rotatable part, particularly a camshaft and/or a crankshaft of an internal-combustion engine, it is useful to change the clamping conditions and/or the secondary vibrations as a function particularly of the rotational speed and/or of the crank angle or camshaft angle of the internal-combustion engine.

In a useful manner, the radial adjustment of the axial adjusting unit 31 and the artificial generating of the secondary vibration can be connected with one another, whereby the arrangement or the method according to the invention becomes more flexible.

The combination of these two usage possibilities of a shaft bearing 3 according to the invention can take place in that an alternating voltage with an additional direct voltage (a so-called offset voltage) is used as the electric voltage.

The offset voltage controls the radial course or the radial contact pressure of the half-shell piezoelements of the axial adjusting unit 31, while the alternating voltage excites the piezoelements of the axial adjusting unit 31 to carry out a secondary vibration. As a result, the half-shell piezoelements of the axial adjusting unit carry out a secondary vibration whose zero point is arranged at the site which is determined by the offset voltage.

Figure 3:
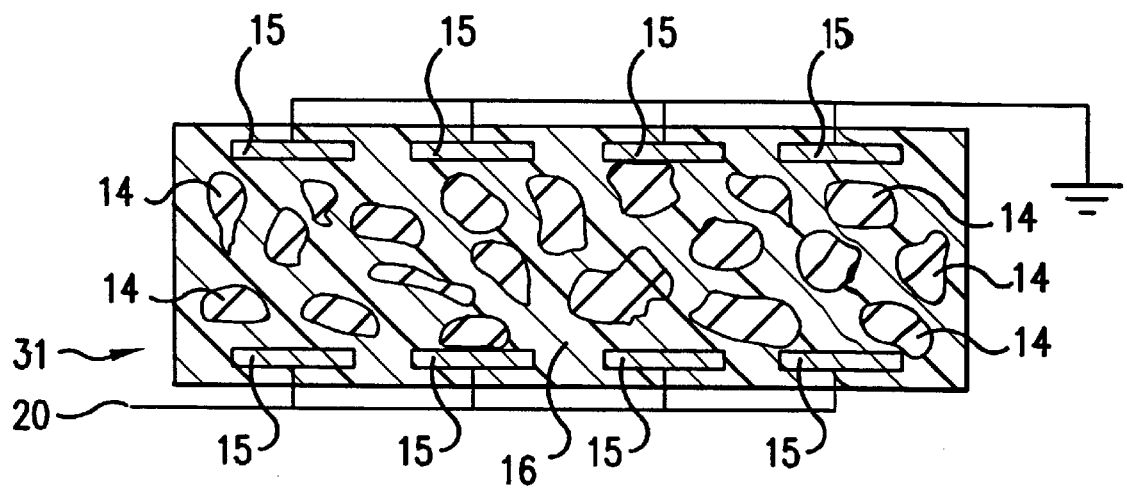
FIG. 3 is a view of an axial adjusting unit which is constructed in the manner of a seal with integrated piezoelements.
Figure 4:
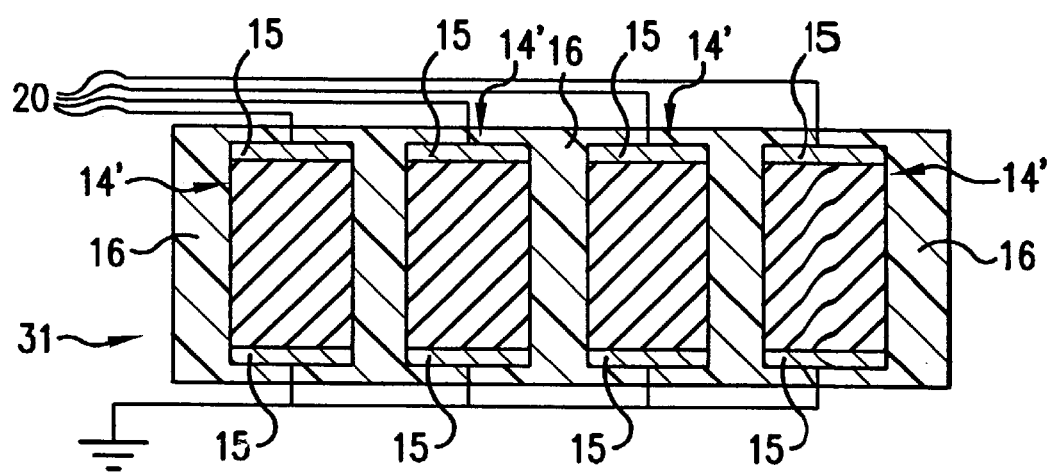
FIG. 4 is a view of an axial adjusting unit which is constructed in the manner of a seal with integrated and oriented piezoelements.
Figure 5:
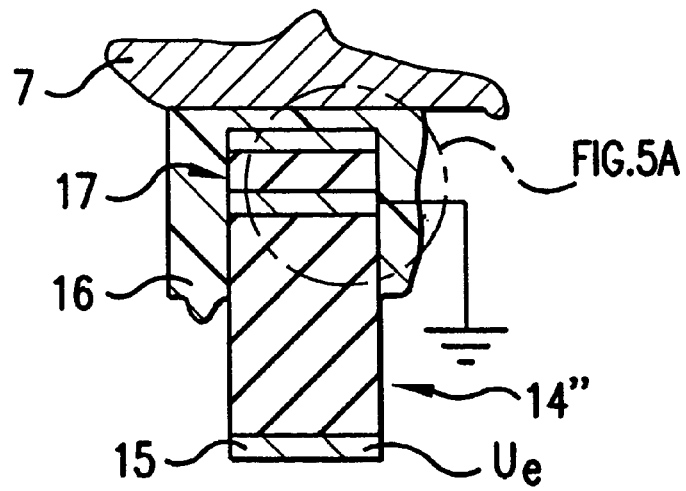
FIG. 5 is a view of an axial adjusting unit and an enlargement of its cutout, the axial adjusting unit being constructed in the manner of a seal with integrated and oriented piezoelements as well as with integrated contacts.
Figure 5A:
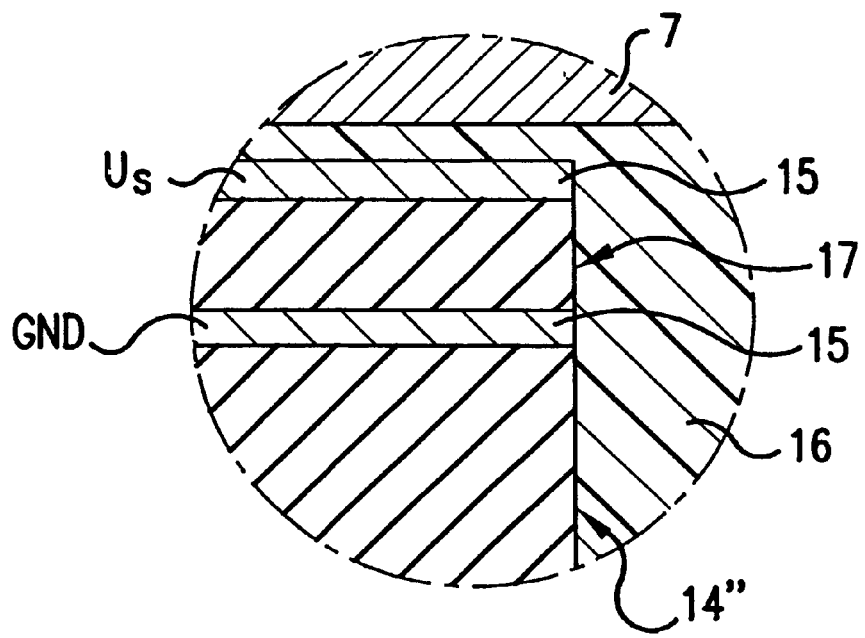

Instead of the axial adjusting units 31 illustrated in FIGS. 1 to 2, which are always formed of massive piezoelements, an axial adjusting unit 31 can, in a special manner, also be constructed as a seal, in which the piezoelements 14, 14', 14'' are arranged in a plastic matrix 6. Corresponding embodiments of these (active) seals are illustrated in FIGS. 3 to 5. In the case of these seals, it is advantageous that such axial adjusting units (31), in addition to the sealing effect, also exercise a protective effect on the piezoelements 14, 14', 14'' which is the result of the plastic matrix 16 of the seal surrounding them.

FIG. 3 shows a seal of an axial adjusting unit 31 with a matrix 16 consisting of a preferably electrically conductive plastic material in which several piezoelements 14 of any size, orientation and physical design are embedded. Such an arrangement is generally called a 0-3-piezoceramics-polymer-composite. In the area of the wall of the seal, electric contacts 15 are advantageously provided which are connected by electric control lines 20 with a control unit (not shown).

By means of the electric contacts 15, the individual piezoelements 14 can, on the one hand, be triggered in a targeted manner and, on the other hand, it is possible to tap electric voltage, which can be generated, for example, by the fact that vibrations transmitted by a rotatable part 2 exercise a pressure on the piezoelements 14 and deform them.

In a simple case, the electric contacts 15 in the case of a seal may also be eliminated. Although, in this case, a deformation of the piezoelements 14 resulting from transmitted vibrations also leads to an electric voltage, the electric voltage is then converted here to a heating of the plastic matrix 16 of the seal, whereby the system is also damped.

FIG. 4 illustrates another active seal of an axial adjusting unit 31 with a plastic matrix 16 in which several piezoelements 14' are embedded. In contrast to the embodiment according to FIG. 3, these piezoelements 14' are of a defined size and shape and, in addition, are arranged in an oriented manner. Such an arrangement is generally called a 1-3-piezoceramics-polymer composite.

Depending on the advantages in the respective application, the individual piezoelements 4' may, for example, be massive and/or be formed of several stacked layers of individual plies of particularly foil-type and/or disk-type piezoceramics. In contrast to the massive construction of piezoelements, in the case of the multi-layer systems, the tension decreases while the stress and the active surface are the same, whereas the current is increased.

In the area of the wall of the seal, electric contacts 15 are also arranged which are also connected by electric control lines 20 with a control unit (not shown). In contrast to the seal according to FIG. 3, in the case of the seal according to FIG. 4, each piezoelement 14' is electrically contacted individually and can therefore also be individually triggered in a separate manner.

By way of the electric contacts 15, the individual piezoelements 14' can be excited in a targeted manner to carry out secondary vibrations with desired frequencies and amplitudes. The secondary vibrations may be caused to enter an interference with the vibrations transmitted from the rotatable part 2 and/or can be superimposed on these. In the case of a negative interference, the noises previously perceived without this influence can at least be reduced.

The piezoelements 14' of the seal of an axial adjusting unit 31 are preferably constructed in the manner of piezostacks and/or are arranged in a lamella-type manner and particularly aligned behind one another in the seal.

During the manufacturing of the seal, the thus arranged piezoelements 14' are expediently electrically contacted before they are embedded in the plastic material forming the matrix 16 of the seal. So that the seal of an axial adjusting unit 31 continues to fulfill its normal purpose, the plastic material forming the matrix 16 is preferably manufactured of a polymer and particularly of an elastomer.

FIG. 5 illustrates an active seal of an axial adjusting unit 31 with a plastic matrix 16 in which several piezoelements 14" are embedded with assigned piezoelectric sensors 17. With respect to the construction and the oriented arrangement, the piezoelements 14" are largely similar to those according to FIG. 4.

However, in the direction of their active axis, a preferably piezoelectric sensor 17 is arranged behind them. The sensor 17 has a common and an additional electric contact 15. The common contact 15, which is arranged between the piezoelement 14" and the sensor 17, is expediently grounded or applied to an electric zero potential.

By way of the electric contacts 15, the individual piezoelements 14" can be excited in a targeted manner to carry out secondary vibrations with desired frequencies and amplitudes. The secondary vibrations can be caused to interfere with the vibrations transmitted by the rotatable part 2 and/or can be superimposed on these.

Advantageously, in the case of such a seal of an axial adjusting unit 31, by means of the sensor 17, a residual vibration remaining after a desired excitation of the piezoelements 14" can be determined and correspondingly controlled. Together with the pertaining electronic system, this piezo/sensor element 4" therefore forms a control circuit. For this reason, it is, among other things, advantageous to arrange the sensor 17 in the power flux direction and/or in parallel to the deflection direction of the amplitude to be expected or of the modes of the transmitted vibration behind the excitable piezoelement 14".

As the result of the individual electric contacting of each sensor 17 and of the respective piezoelements 14", the determination of the residual vibration and the introduction of the secondary vibration can take place with a good resolution and flexibility.

What is claimed is:

1. A method for detuning the natural frequency of a rotatable part disposed in a shaft bearing wherein the axis of rotation of the rotatable part is coaxial with an axis of rotation of a shaft bearing, said method comprising the steps of: detecting the vibrations which occur at the rotatable part;

providing a radial adjusting unit made of a piezoelectrically active material;

providing a change in the clamping condition by a reversible change in one of a radial extension and a pressure against said rotating part, wherein said change in clamping condition are controlled as a function of said detected vibrations of said rotatable part; and converting the control change in clamping condition to a change in transmission function of the detected vibration existing between said rotatable part and the shaft bearing or between the rotating part and a component contacting the shaft bearing.

2. Method according to claim 1, wherein, in the case of a rotatable part of an internal-combustion machine, particularly of an internal-combustion engine, particularly of an internal-combustion, the clamping conditions are changed as a function of a parameter, particularly of the rotational speed and/or the crank angle of an internal-combustion engine.

3. Method according to claim 1, wherein the clamping conditions are changed as a function of at least one of the temperature of the rotatable part and of the shaft bearing.

4. Method according to claim 1, wherein data for controlling the clamping conditions are retrieved from a set of data filed in a preferably electronic data memory.

5. Method according to claim 1, wherein a natural frequency of the rotatable part is changed by changing the clamping conditions.

6. Apparatus for detuning the natural frequency of a rotatable part disposed rotatably in a shaft bearing and having an axis of rotation which is coaxial with an axis of rotation or an axis of symmetry of the shaft bearing, said apparatus comprising:

an axial adjusting unit made of a piezoelectrically active material wherein at least one of the effective radial dimension of said axial adjusting unit and an axial contact pressure onto the rotatable part in the area of the rotatable part is changeable in a reversible manner during rotation of said rotatable part.

7. The apparatus according to claim 6, wherein the rotatable part is a rotating system element, preferably a crankshaft or a camshaft of an internal-combustion engine, particularly of a diesel or gasoline engine.

8. The apparatus according to claim 6, wherein the rotatable part is a rotating system element, preferably a shaft or a rotator of an electric motor.

9. The apparatus according to claim 6, wherein the rotatable part is a rotating system element of a propeller or a jet engine.

* * * * *